United States Patent
Garza et al.

(10) Patent No.: US 9,159,050 B2
(45) Date of Patent: Oct. 13, 2015

(54) PROVIDING ATOMICITY FOR A UNIT OF WORK

(75) Inventors: Jose Emir Garza, Surrey (GB); Stephen James Hobson, Middlesex (GB); Martin Mulholland, Hampshire (GB); Steven Powell, Hampshire (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 977 days.

(21) Appl. No.: 11/911,206

(22) PCT Filed: Apr. 6, 2006

(86) PCT No.: PCT/EP2006/061404
§ 371 (c)(1),
(2), (4) Date: Aug. 18, 2008

(87) PCT Pub. No.: WO2006/108799
PCT Pub. Date: Oct. 19, 2006

(65) Prior Publication Data
US 2009/0043845 A1      Feb. 12, 2009

(30) Foreign Application Priority Data

Apr. 12, 2005 (GB) .................................. 0507350.7
Mar. 29, 2006 (GB) .................................. 0606225.1

(51) Int. Cl.
*G06Q 10/10* (2012.01)

(52) U.S. Cl.
CPC ........................................ *G06Q 10/10* (2013.01)

(58) Field of Classification Search
USPC ................. 709/201–203, 204–207, 106, 227; 714/415
See application file for complete search history.

(56) References Cited

U.S. PATENT DOCUMENTS

| | | | |
|---|---|---|---|
| 5,884,327 A * | 3/1999 | Cotner et al. ........................... | 1/1 |
| 6,247,023 B1 * | 6/2001 | Hsiao et al. ............................ | 1/1 |
| 6,266,698 B1 * | 7/2001 | Klein et al. ................... | 709/227 |
| 6,463,456 B1 * | 10/2002 | Kan et al. ..................... | 709/201 |
| 6,493,726 B1 * | 12/2002 | Ganesh et al. ................ | 707/201 |
| 6,772,176 B1 * | 8/2004 | Saha et al. ............................ | 1/1 |
| 6,845,384 B2 * | 1/2005 | Bamford et al. ....................... | 1/1 |
| 6,941,360 B1 * | 9/2005 | Srivastava et al. ............ | 709/223 |
| 2003/0154423 A1 * | 8/2003 | Egolf et al. ...................... | 714/15 |
| 2004/0148289 A1 * | 7/2004 | Bamford et al. ................ | 707/10 |
| 2005/0071384 A1 * | 3/2005 | Cotner et al. .................. | 707/200 |
| 2006/0075277 A1 * | 4/2006 | Johnson et al. .................... | 714/4 |

* cited by examiner

*Primary Examiner* — Thai Nguyen
(74) *Attorney, Agent, or Firm* — Steven L. Nichols; Van Cott, Bagley, Cornwall & McCarthy P.C.

(57) ABSTRACT

A method for providing atomicity for a unit of work involving a plurality of participants, the method comprising the steps of: sending a prepare request to at least one participant, wherein the request comprises data required for recovery purposes of the unit of work; and on recovery of the unit of work, recovering the unit of work comprising: obtaining the data from the at least one participant; and using the obtained data to recover and preserve the atomicity of the unit of work.

17 Claims, 8 Drawing Sheets

PROVIDING ATOMICITY FOR A UNIT OF WORK

FIELD OF THE INVENTION

The present invention relates to a method, system and computer program for providing atomicity for a unit of work.

BACKGROUND OF THE INVENTION

In the field of transaction processing, units of work are generally required to have what are known as the ACID properties. ACID is an acronym representing the four unit of work properties of: Atomicity, Consistency, Isolation and Durability. Atomicity requires that either all the operations of the unit of work must be seen to occur or none must be seen to occur. Consistency requires a unit of work to maintain the consistency of in the data on which it operates. Isolation requires a unit of work not to read the intermediate results of another transaction. Durability requires the results of a committed unit of work to be made permanent and that the other ACID attributes can be guaranteed even in the event of system failure. However the responsibility to ensure these properties falls to different components. For example, if the unit of work is a transaction, atomicity is provided by the transaction co-ordinator, consistency by the application, isolation and durability by a resource manager. Further in some units-of-work not all such properties are observed, for example, isolation is not observed for a unit of work which is a long running (extended) transaction and which comprises several transactions.

For example, a well known and understood unit of work is a transaction and it is the role of a transaction co-ordinator or middleware to provide atomicity. Thus, for example, if an application involves two operations in a transaction and then requests the transaction co-ordinator to commit the transaction, the transaction co-ordinator must ensure that both operations commit (succeed). Alternatively if the application requests the transaction co-ordinator to back out the transaction, the transaction co-ordinator must ensure that both operations are backed out (fail).

A major problem in providing atomicity is that it must be guaranteed even in the event of a failure of the system on which the transaction co-ordinator is executing. For example, if a transaction involves two operations and then commits, the system might fail after the transaction co-ordinator has committed the first operation but before the same has been done for the second operation. As a result when the system is restarted the transaction co-ordinator must ensure that the second operation also commits. In order to provide this functionality it is necessary for the transaction co-ordinator to maintain a non-volatile log which survives a system failure and which records the progress of each transaction. For example the transaction co-ordinator will maintain in the log a sequential record of the operations involved in each transaction and the progressive states of the transaction. Further, at certain points in the transaction the transaction must be held whilst the transaction co-ordinator ensures that a log record has been written to non-volatile storage. However, writing to a log is time consuming.

DISCLOSURE OF THE INVENTION

According to a first aspect, there is provided a method for providing atomicity for a unit of work involving a plurality of participants, the method comprising the steps of: sending a prepare request to at least one participant, wherein the request comprises data required for recovery purposes of the unit of work; and on recovery of the unit of work, recovering the unit of work comprising: obtaining the data from the at least one participant; and using the obtained data to recover and preserve the atomicity of the unit of work.

Preferably, the data comprises details from which the outcome of the unit of work can be determined. More preferably, the data comprises a list of other participants in the unit of work. Still more preferably, the data sent to the last participant to which a prepare request is sent comprises an indication that the outcome of the unit of work is commit.

In a preferred embodiment, the step of recovering the unit of work further comprises: in response to the obtained data comprising an indication that the outcome of the unit of work is commit, sending a commit request to the at least one participant. Preferably, the method further comprises the step of: sending a forget request to the at least one participant. More preferably, the step of obtaining data from the at least one participant comprises: sending a request for the data to the at least one participant. Still more preferably, the step of obtaining data from the at least one participant comprises: receiving a message from the at least one participant, the message comprising the data.

According to a second aspect, there is provided a method for participating in a unit of work, the method comprising the steps of: receiving a prepare request from a co-ordinator of the unit of work, the prepare request comprising data for storage on behalf of the co-ordinator; and processing the prepare request, the processing step comprising the steps of: establishing that the update can be completed; storing in non-volatile storage the data; and responding to the prepare request, the response comprising an indication that the update can be completed.

Preferably, the method further comprises the steps of: receiving a request from the co-ordinator for the data; and in response to receiving the request, providing the data to the co-ordinator. More preferably, the method further comprises the step: sending the data to the coordinator. Still more preferably, the step of sending data is responsive to a determined loss of contact with the coordinator.

According to a third aspect, there is provided a co-ordinator for providing atomicity for a unit of work involving a plurality of participants, the co-ordinator comprising: means for sending a prepare request to at least one participant, wherein the request comprises data required for recovery purposes of the unit of work; and on recovery of the unit of work, means for recovering the unit of work comprising: means for obtaining the data from the at least one participant; and means for using the obtained data to recover and preserve the atomicity of the unit of work.

According to a fourth aspect, there is provided a participant for participating in a unit of work, comprising: means for receiving a prepare request from a co-ordinator of the unit of work, the prepare request comprising data for storage on behalf of the co-ordinator; and means for processing the prepare request, comprising: means for establishing that the update can be completed; non-volatile storage for storing the data; and means for responding to the prepare request, the response comprising an indication that the update can be completed.

According to fifth and sixth aspects, there are provided computer programs comprising program code means adapted to perform all the steps of the methods described above when said programs are run on a computer. According to a seventh aspect, there is provided a method for resolving a unit of work involving a plurality of participants, the method comprising the steps of: obtaining, by each of the plurality of participants, identifier data associated with each of the other plurality of participants; obtaining, by each of the plurality of participants from each of the other plurality of participants, a first message comprising a state associated with the unit of work; and using, by at least one participant, a received first message to recover the unit of work.

According to an eighth aspect, there is provided a system for resolving a unit of work involving a plurality of participants, the system comprising: means for obtaining, by each of the plurality of participants, identifier data associated with each of the other plurality of participants; means for obtaining, by each of the plurality of participants from each of the other plurality of participants, a first message comprising a state associated with the unit of work; and means for using, by at least one participant, a received first message to recover the unit of work.

According to a ninth aspect, there is provided a participant for resolving a unit of work involving a plurality of participants, the participant comprising: means for obtaining identifier data associated with each of the other plurality of participants; means for obtaining a first message comprising a state associated with the unit of work from the each of the other plurality of participants; and means for using a received first message to recover the unit of work.

According to a tenth aspect, there is provided a computer program comprising program code means adapted to perform all the steps of the method described above when said program is run on a computer.

BRIEF DESCRIPTION OF THE DRAWINGS

The present invention will now be described, by way of example only, with reference to preferred embodiments thereof, as illustrated in the following drawings.

DETAILED DESCRIPTION OF THE PREFERRED EMBODIMENTS

Figure 1:
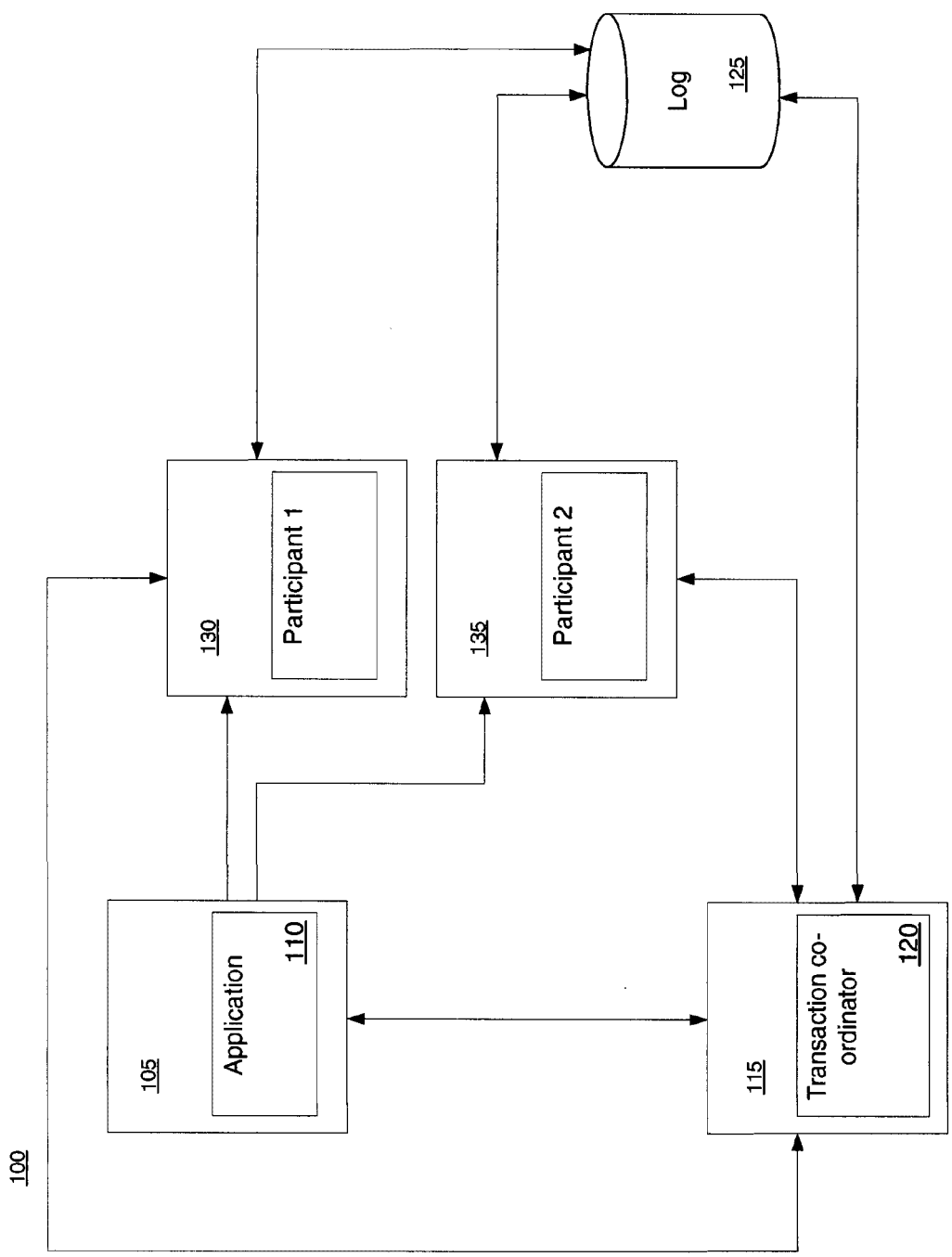
FIG. 1 is a block diagram of a system in which the present invention may be implemented.

According to a preferred embodiment the chosen unit of work is a transaction. FIG. 1 is a block diagram of a system (100) in which the present invention can be applied. FIG. 1 shows a first data processing system (105) comprising an owning application (110), a second data processing system (115) comprising a transaction co-ordinator (120) for executing transactions, a third data processing system (130) comprising Participant 1, that is a first resource (e.g. a database) and a fourth data processing system (135) comprising Participant 2, that is a second resource (e.g. a database). The system (100) also comprises a log (125) to which the transaction co-ordinator (120), Participant 1 and Participant 2 can write one or more log records having data associated with a transaction.

It should be understood that components involved in a transaction (i.e. the owning application (110), the transaction co-ordinator (120), Participant 1 and Participant 2) can reside on any data processing system and that the components can all reside on the same data processing system.

Figure 2:
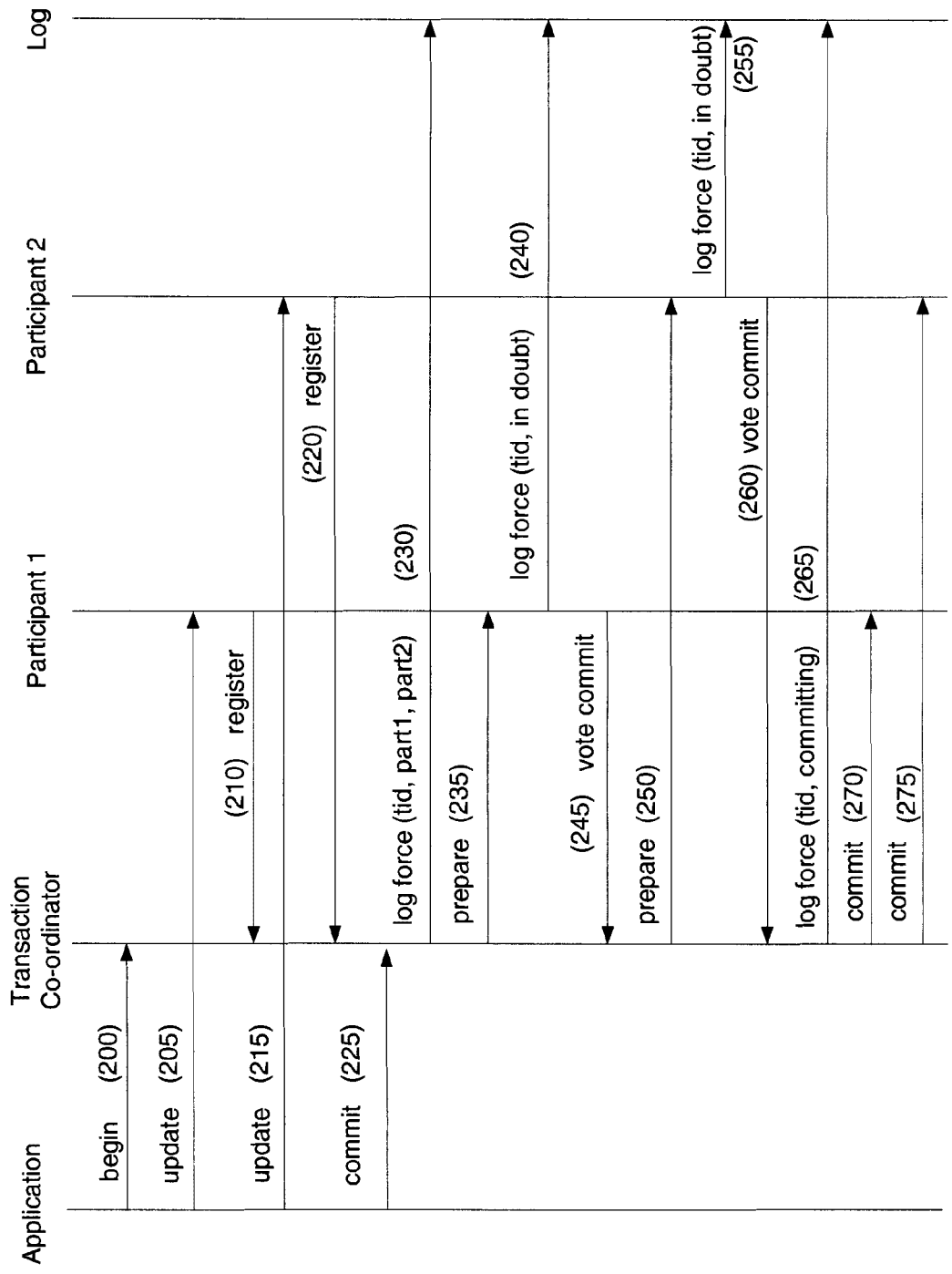
FIG. 2 is a schematic diagram of the components involved in a transaction and the flows between those components, according to the prior art.

FIG. 2 is a schematic diagram of the components involved in an example transaction and the flows involved between the components, according to the prior art, according to a two phase commit protocol. Firstly, the application (110) flows a begin request (200) to the transaction co-ordinator (120), which indicates the start of a transaction. Next, the application (110) sends an update request (205) (that is, a request that makes a change to a participant), to Participant 1. In response to receiving the update request, Participant 1 registers (210) as a participant in the transaction with the transaction co-ordinator (120) and receives a transaction identifier of the transaction in response. Next, the application sends an update request (215) to Participant 2. In response to receiving the update request, Participant 2 registers (220) as a participant in the transaction with the transaction co-ordinator (120) and receives a transaction identifier of the transaction in response.

In response to Participant 1 and Participant 2 successfully performing the update requests, the application (110) sends a commit request (225) to the transaction co-ordinator (120). The application (110) does not regain control until commit processing completes.

In response to the commit request (225) from the application (110), the transaction co-ordinator (120) force writes (230) a first log record to the log (125), wherein the first log record comprises an identifier associated with the transaction, an identifier associated with Participant 1 and an identifier associated with Participant 2. Participant 1 does not have data associated with Participant 2 and vice versa. Thus, only the transaction co-ordinator has data associated with participants in a transaction. Note that a forced write does not return until the data written is hardened to non-volatile storage.

Next, once the forced log write completes (guaranteeing the data is stored in non-volatile storage), the transaction co-ordinator (120) flows a prepare request (235) to Participant 1. It should be understood that a participant, after being involved in the transaction, assumes rollback until it receives a prepare request. In other words if the participant chooses to take unilateral action for the transaction, after being involved in a transaction and before receiving a prepare request, it should rollback updates associated with the transaction.

In response to receiving the prepare request, Participant 1 force writes (240) a second log record to the log, wherein the second log record comprises the transaction identifier received in response to the register request and a state associated with the transaction, namely, "in doubt". This state indicates that Participant 1 can no longer assume rollback but needs to wait to be informed of a transaction outcome. Next, Participant 1 flows a commit vote (245) (i.e. a response to the prepare request) to the transaction co-ordinator (120), indicating that Participant 1 can successfully participate in the transaction. It should be understood, that if Participant 1 cannot successfully participate in the transaction, it should back out any updates it performed and vote rollback without writing a log record.

Next, the transaction co-ordinator (120) flows a prepare request (250) to Participant 2. In response to receiving the prepare request, Participant 2 force writes (255) a third log record to the log, wherein the third log record comprises the transaction identifier and a state associated with the transaction, namely, "in doubt". This state indicates that Participant 2 can no longer assume rollback but needs to wait to be informed of the transaction outcome. Next, Participant 2 flows a commit vote (260) (i.e. a response) to the transaction co-ordinator (120), indicating that Participant 2 can successfully participate in the transaction. It should be understood, that if Participant 2 cannot successfully participate should back out any updates it performed and vote rollback without writing a log record.

The transaction co-ordinator (120) collects all votes, but the collected votes are not hardened in the log (125). Next, the transaction co-ordinator (120) force writes (265) a fourth log record to the log, wherein the fourth log record comprises the transaction identifier and a computed outcome associated with the transaction. Assuming that all participants voted commit, the decision is commit. If one or more participants vote rollback, the decision is rollback.

Next, the transaction co-ordinator (120) flows a commit request (270) to Participant 1 and a commit request (275) to Participant 2, indicating to the participants that they should commit the transaction. After, the transaction has been committed, the participants "forget" the transaction, resulting in the log records associated with the participants becoming eligible for purging.

In a first example, in the event that the transaction co-ordinator (120) fails after the first log record is written but before a prepare request (235) is sent to Participant 1, on restart, the transaction co-ordinator (120) reads the log (125) to determine the last successful state of the transaction recorded in the log (125). In the first example, the first log record recorded by the transaction co-ordinator (120) is read and comprises data associated with the transaction identifier, Participant 1 identifier and Participant 2 identifiers. From the data in the log (125), the transaction co-ordinator (120) determines that a request to commit the transaction was received but votes from all participants have not been collected. As a result it is known that no participant has been committed and to ensure atomicity of the transaction a rollback request is sent to each participant. Accordingly atomicity of the transaction is guaranteed.

In a second example, if the transaction co-ordinator (120) fails after receiving a commit vote (245) from Participant 1, on restart, the transaction co-ordinator (120) reads the log (125) to determine the last successful state of the transaction recorded in the log (125). In the second example, the first log record recorded by the transaction co-ordinator (120) is read and comprises data associated with the transaction identifier, Participant 1 identifier and Participant 2 identifier. From the data in the log (125), the transaction co-ordinator (120) determines that a request to commit the transaction was received from the application (110) but votes from all participants have not been collected. As a result it is known that no participant has been committed and to ensure atomicity of the transaction a rollback request is sent to each participant. Accordingly atomicity of the transaction is guaranteed.

In a third example, if the transaction co-ordinator (120) fails after a commit request is sent to Participant 1, on restart, the transaction co-ordinator (120) reads the log (125) to determine the last successful state of the transaction recorded in the log (125). The fourth log record recorded by the transaction co-ordinator (120) is read and comprises data associated with the transaction identifier and the computed outcome associated with the transaction (that is, "committing"). From this data the transaction co-ordinator (120) determines that each participant voted commit and an outcome of commit was computed, but it cannot determine whether commit was flowed to any participant. As a result, the transaction co-ordinator sends commit requests (270, 275) to Participant 1 and Participant 2. Accordingly atomicity of the transaction is guaranteed.

Note that in the prior art flows, the transaction co-ordinator forces its log twice: a first time to record the transaction identifier and participant data and a second time to record the transaction identifier and the computed outcome associated with the transaction. Although logging this data results in atomicity, disadvantageously, the log writes by the transaction co-ordinator are time consuming.

Further note that the transaction described with reference to FIG. 2 is an example of a two-phase commit transaction. A skilled person will realise that there are many variations possible, for example the transaction may contain any number of participants and further one or more participants may not perform updates.

Figure 3:
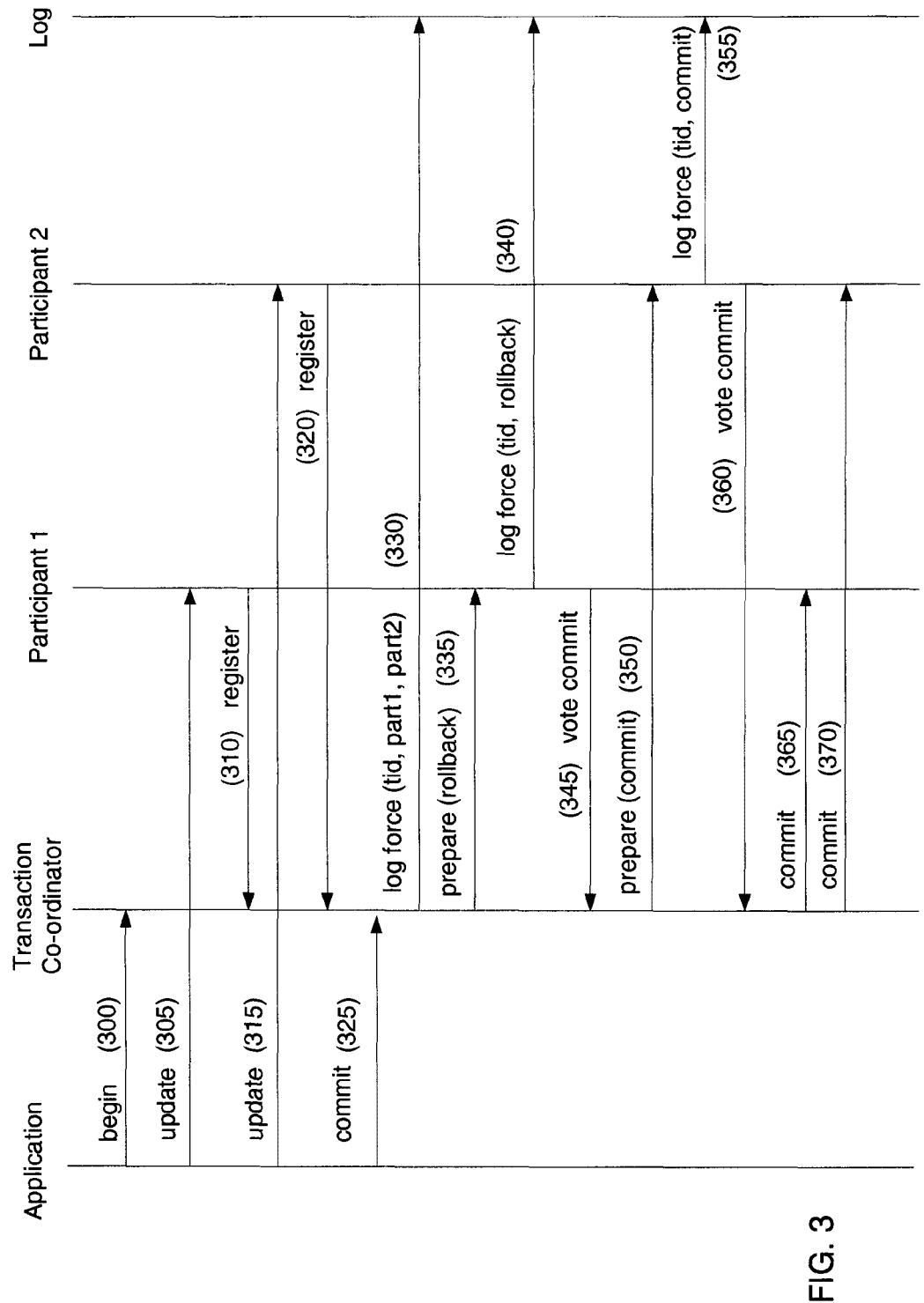
FIG. 3 is a schematic diagram of the components involved in a transaction and the flows between those components, according to a first embodiment of the present invention.

FIG. 3 is a schematic diagram of the components involved in the example two phase commit transaction of FIG. 2, and the flows involved between the components, according to a first embodiment of the present invention. In the first embodiment, the number of log writes performed by the transaction co-ordinator (120) is reduced, because data associated with an indication of an outcome is flowed with the prepare request.

Firstly, the application (110) flows a begin request (300) to the transaction co-ordinator (120), which indicates the start of a transaction. Next, the application (110) sends an update request (305) (that is, a request that makes a change to a participant), to Participant 1. In response to receiving the update request, Participant 1 registers (310) as a participant in the transaction with the transaction co-ordinator (120). Next, the application sends an update request (315) to Participant 2. In response to receiving the update request, Participant 2 registers (320) as a participant in the transaction with the transaction co-ordinator (120).

In response to Participant 1 and Participant 2 successfully performing the update requests, the application (110) sends a commit request (325) to the transaction co-ordinator (120). In response to the commit request (325) from the application (110), the transaction force writes (330) a first log record to the log (125), wherein the first log record comprises an identifier associated with the transaction, an identifier associated with Participant 1 and an identifier associated with Participant 2.

Next, once the forced log write completes, the transaction co-ordinator (120) flows a prepare request (335) to Participant 1. The prepare request comprises data, namely, an outcome indication of rollback. In response to receiving the prepare request and associated data, Participant 1 writes (340) a second log record to the log, wherein the second log record comprises the transaction identifier and the indication of "rollback". Next, Participant 1 flows a commit vote (345) (i.e. a response) to the transaction co-ordinator (120), indicating that Participant 1 can successfully participate in the transaction.

Next, the transaction co-ordinator (120) flows a prepare request (350) to Participant 2. The prepare request comprises data, namely, an indication of "commit". In response to receiving the prepare request and associated data, Participant 2 writes (355) a third log record to the log, wherein the third log record comprises the transaction identifier and the outcome of commit. Next, Participant 2 flows a commit vote (360) (i.e. a response) to the transaction co-ordinator (120), indicating that Participant 2 can successfully participate in the transaction.

Once the transaction co-ordinator (120) has collected all votes, advantageously, the transaction co-ordinator (120) can immediately flow a request associated with a computed outcome to the participants, without the need for a log write of the computed outcome, because the participants themselves maintain data associated with an outcome. Thus, the transaction co-ordinator (120) flows a commit request (365) to Participant 1 and a commit request (370) to Participant 2, indicating to the participants that they should commit the transaction.

In a fourth example, in the event that the transaction co-ordinator (120) fails after writing the first log record but before a prepare request (335) is sent to Participant 1, on restart, the transaction co-ordinator (120) reads the first log record and determines that a request to commit the transaction was received from the application (110) but the transaction was not completed. As a result the transaction coordinator (120) sends a request to each participant, to receive any data that they have logged, so that the transaction co-ordinator (120) can determine the last successful state of the transaction recorded in the log (125). In the fourth example, Participant 1 and Participant 2 reply, indicating that they have no log records. Thus, the transaction co-ordinator (120) determines that either prepare has not been flowed to any participants or all participant have been completed. As a result the transaction coordinator (120) flows rollback to each participant which either causes each participant to rollback, or has no effect if each participant has completed. Accordingly atomicity of the transaction is guaranteed.

In a fifth example, if the transaction co-ordinator (120) fails after receiving a commit vote (345) from Participant 1, on restart, the transaction co-ordinator (120) reads the first log record and determines that a request to commit the transaction was received from the application (110) but the transaction was not completed. As a result the transaction coordinator (120) sends a request to each participant, to receive any data that they have logged, so that the transaction co-ordinator (120) can determine the last successful state of the transaction recorded in the log (125). In the fifth example, Participant 1 replies with the data in the second log record, that is, the transaction identifier and a "rollback" indication. Participant 2 sends a reply indicating that it has no log record.

The transaction co-ordinator (120) determines that since no participants have a log record with an outcome indication of "commit", no participants have been committed and as a result rollback is flowed to each participant. Accordingly atomicity of the transaction is guaranteed.

In a sixth example, if the transaction co-ordinator (120) fails after a commit request is sent to Participant 1, on restart, the transaction co-ordinator (120) sends a request to each participant, to receive any data that they have logged, so that the transaction co-ordinator (120) can determine the last successful state of the transaction recorded in the log (125). In the sixth example, Participant 1 sends a reply indicating that it has no knowledge of the transaction, since Participant 1 has forgotten the transaction as part of the commit request. Participant 2 replies with the data in the third log record, that is, the transaction identifier and a "commit" indication. Now, the transaction co-ordinator (120) can determine that the computed outcome was to commit, since the last participant (i.e. Participant 2) has sent back an indicated outcome of commit. The transaction co-ordinator (120) can also determine that a commit request was sent to Participant 1, because it has forgotten the transaction a part of the commit request. Thus, the transaction co-ordinator (120) immediately flows a commit request (370) to Participant 2. Accordingly atomicity of the transaction is guaranteed. However, also note that if the transaction coordinator were to also flow a commit to Participant 1, although the commit would be rejected, atomicity of the transaction is not compromised because the updates of Participant 1 have already been committed.

Advantageously, in the first embodiment of the present invention, for a participant in a transaction, data associated with an indication of possible outcome is flowed with a prepare request, this indication being "rollback" to all participants except the last participant to which prepare is flowed, for which the indication is "commit". Thus, the transaction co-ordinator need not log any data associated with an outcome of the transaction, because upon failure, the transaction co-ordinator can recover data from the participants themselves in order to re-build the transaction. If no participants have logged an indication of "commit" the transaction is rolled back. Note that including a "rollback" indication is optional because an outcome of rollback for the transaction can be determined by the lack of an indication of "commit".

Preferably the participant provided with the "commit" indication during prepare is the last participant to be committed. Alternatively participant can log this indication as part of the processing of a commit request, in which case it will need to retain the indication until it is told to forget by the transaction coordinator.

Note that any indication from which the transaction coordinator can deduce the outcome of a transaction may be used in place of "rollback" and/or "commit". For example, these could be different strings, numeric values, or binary values.

Note that if a participant votes rollback in response to prepare it can forget the transaction.

Figure 4:
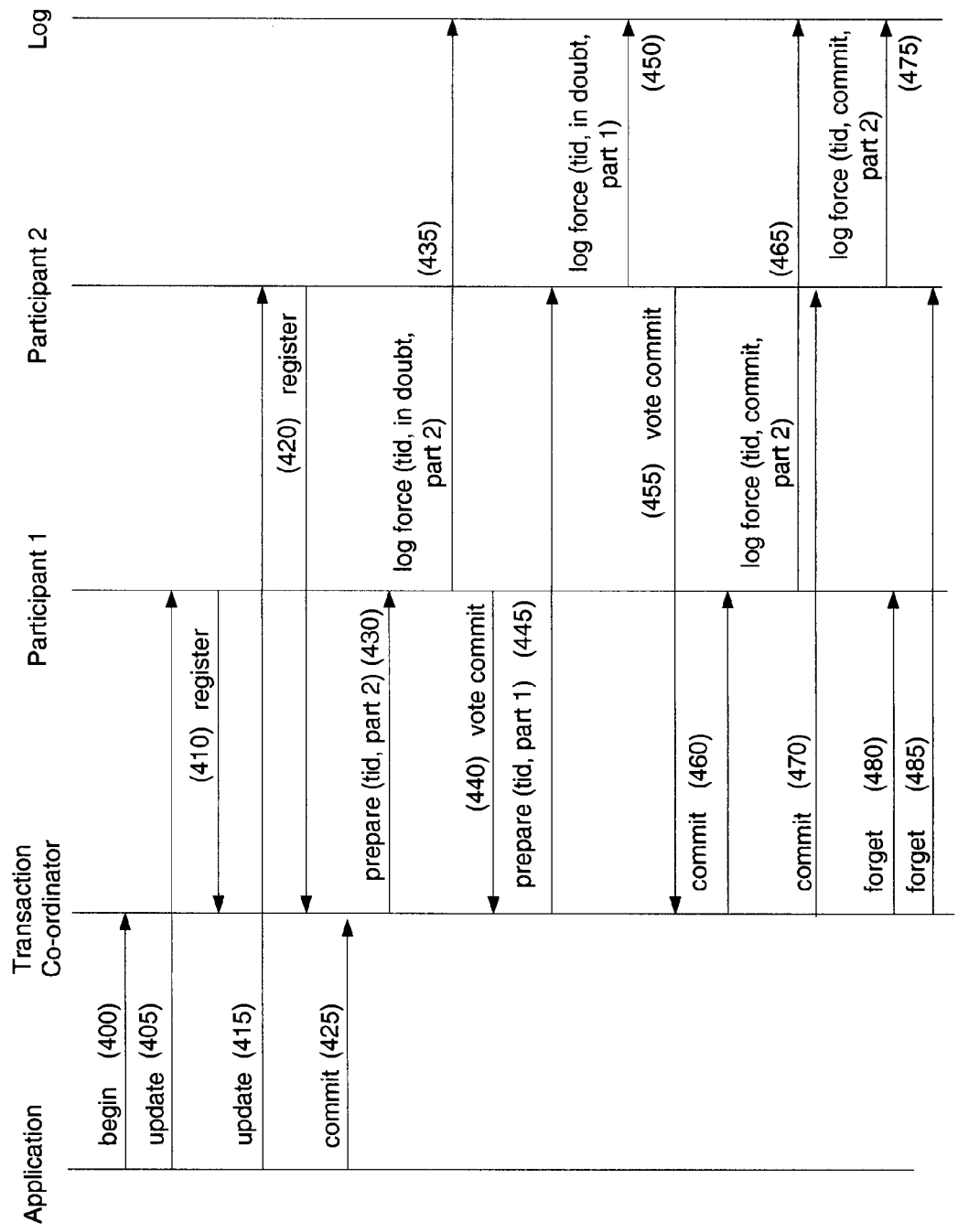
FIG. 4 is a schematic diagram of the components involved in a transaction and the flows between those components, according to a second embodiment of the present invention.

FIG. 4 is a schematic diagram of the components involved in the example transaction of FIG. 2, and the flows involved between the components, according to a second embodiment of the present invention. In the second embodiment, the transaction co-ordinator (120) does not need to maintain a log, because data associated with a participant is flowed with the prepare request. Advantageously this removes the need for the transaction coordinator to have access to a log file.

Firstly, the application (110) flows a begin request (400) to the transaction co-ordinator (120), which indicates the start of a transaction. Next, the application (110) sends an update request (405) to Participant 1. In response to receiving the update request, Participant 1 registers (410) as a participant in the transaction with the transaction co-ordinator (120). Next, the application sends an update request (415) to Participant 2. In response to receiving the update request, Participant 2 registers (420) as a participant in the transaction with the transaction co-ordinator (120). In response to Participant 1 and Participant 2 successfully performing the update requests the application (110) sends a commit request (425) to the transaction co-ordinator (120).

In response to the commit request (425) from the application (110), the transaction co-ordinator (120) flows a prepare request (430) to Participant 1. The prepare request comprises data, namely, an identifier associated with the transaction and an identifier associated with each other participant in the transaction which, in this example, is Participant 2.

In response to receiving the prepare request and associated data, Participant 1 writes (435) a first log record to the log, wherein the first log record comprises the transaction identifier, a state associated with the transaction, namely, "in doubt" and the Participant 2 identifier. Next, Participant 1 flows a commit vote (440) (i.e. a response) to the transaction co-ordinator (120), indicating that Participant 1 can successfully participate in the transaction.

Next, the transaction co-ordinator (120) flows a prepare request (445) to Participant 2. The prepare request comprises data, namely, an identifier associated with the transaction and an identifier associated with each other participant in the transaction which, in this example, is Participant 1.

In response to receiving the prepare request and associated data, Participant 2 writes (450) a second log record to the log, wherein the second log record comprises the transaction identifier, a state associated with the transaction, namely, "in doubt" and the Participant 1 identifier. Next, Participant 2 flows a commit vote (455) (i.e. a response) to the transaction co-ordinator (120), indicating that Participant 2 can successfully participate in the transaction.

Once the transaction co-ordinator (120) has collected all votes, the transaction co-ordinator (120) can directly flow a request associated with a computed outcome to the participants. That is, the transaction co-ordinator (120) flows a commit request (460) to Participant 1 and a commit request (470) to Participant 2, indicating to the participants that they should commit the transaction.

In response to receiving the commit request, Participant 1 force writes (465) a third log record to the log, wherein the third log record comprises the transaction identifier, a state associated with the transaction, namely, "commit" and the Participant 2 identifier. In response to receiving the commit request, Participant 2 force writes (475) a fourth log record to the log, wherein the fourth log record comprises the transaction identifier, a state associated with the transaction, namely, "commit" and the Participant 1 identifier.

Participants in a transaction cannot forget the transaction until the transaction co-ordinator states that it is acceptable to do so. This is because the transaction co-ordinator must ensure that it can retrieve enough data from the participants in order to re-build the transaction upon failure of the transaction co-ordinator. Thus, after the transaction has been committed, the transaction co-ordinator (120) flows an explicit forget request (480) to Participant 1 and an explicit forget request (485) to Participant 2. Now, the participants' log records comprising participant data can be purged.

Upon restart of a transaction co-ordinator after failure, a participant proactively contacts the transaction co-ordinator and sends the transaction co-ordinator data in its log records. From the log records, the transaction co-ordinator can determine the identifiers of all of the other participants involved in the transaction and thus, the transaction co-ordinator can contact all of the other participants involved in the transaction to retrieve data from their log records. For example, a participant can decide to contact the transaction coordinator based on a loss of contact with the coordinator which can be determined because a pre-determined time limit has expired since it received a prepare request.

In a seventh example, in the event that the transaction co-ordinator (120) fails before a prepare request (330) is sent to Participant 1, on restart, the transaction co-ordinator (120) is not contacted by any participants in the transaction. This is because each of the participants can assume rollback. Thus atomicity of the transaction is guaranteed.

In an eighth example, if the transaction co-ordinator (120) fails after receiving a commit vote (340) from Participant 1, after restart, Participant 1 contacts the transaction co-ordinator (120) and provides data in the first log record, that is, the transaction identifier, the state associated with the transaction, namely, "in doubt" and the Participant 2 identifier. Thus, from the data received from Participant 1, the transaction co-ordinator (120) now knows that Participant 2 is also involved in the transaction. Thus, the transaction co-ordinator (120) requests status from Participant 2 and Participant 2 replies with an indication that it has no log record and assumes rollback. From this the transaction co-ordinator (120) determines that no participants have been asked to commit and, as a result, flows rollback to each participant. Accordingly atomicity of the transaction is guaranteed.

In a ninth example, if the transaction co-ordinator (120) fails after a commit request is sent to Participant 1, after restart, Participant 1 contacts transaction co-ordinator (120). In this example, Participant 1 sends data including data from the third log record, that is, the transaction identifier, the state associated with the transaction, namely, "commit" and the Participant 2 identifier. This is because the transaction had not reached the state at which Participant 1 is told to forget the transaction. Thus, from the data received from Participant 1, the transaction co-ordinator (120) now knows that Participant 2 is also involved in the transaction and Participant 1 has been committed.

As a result, the transaction co-ordinator (120) contacts Participant 2. In this example, Participant 2 sends the data in the second log record, that is, the transaction identifier, the state associated with the transaction, namely, "in doubt" and the Participant 1 identifier. The transaction co-ordinator (120) therefore determines that Participant 2 has not yet been committed and flows commit to Participant 2. Accordingly atomicity of the transaction is guaranteed.

Advantageously, a participant in a transaction logs participant data associated with the other participants in that transaction. Thus, the transaction co-ordinator need not log any data associated with all of the participants in the transaction. Rather, upon failure, the transaction co-ordinator can recover data associated with all of the participants from the participants themselves.

Note that in the second embodiment, following failure of the transaction co-ordinator a different transaction co-ordinator can be used to recover the transaction. For example, such a different transaction co-ordinator function can be provided by one of the participant involved in the transaction.

Note that any indication from which the transaction coordinator can deduce a status of a transaction may be used in place of "in-doubt" and/or "commit". For example, these could be a different strings, numeric values, or binary values.

Further note that it is possible to combine the first and second embodiments. For example the prepare requests of the first embodiment can include lists of other participants. This removes the need for the transaction co-ordinator to write the first log record.

Note in the examples a participant can be, for example, a transaction aware database and an update request from an application to a participant can be a request to update data in the database.

Further note that whilst in the example the participant and transaction coordinator each use the same log, in practice these can be different logs.

Figure 5:
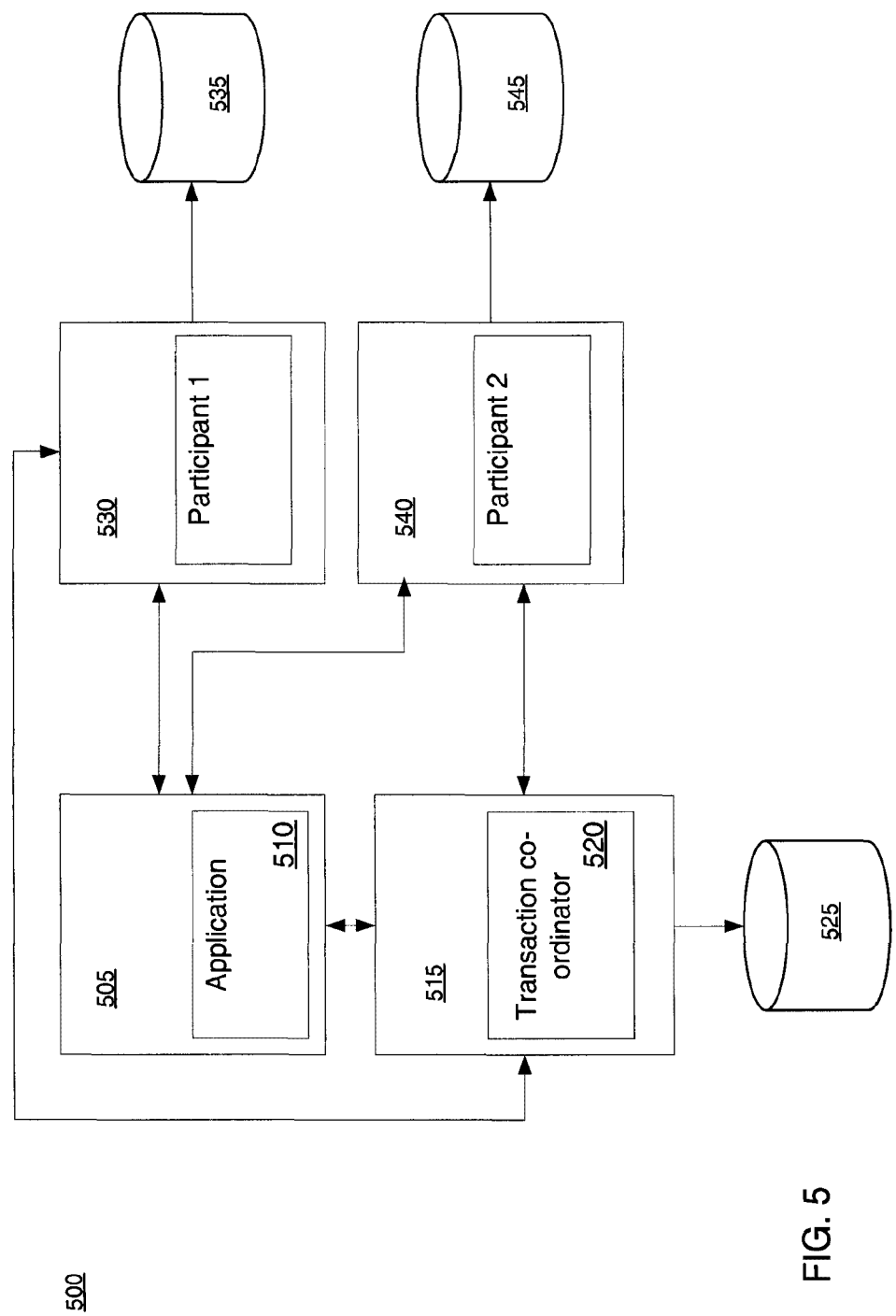
FIG. 5 is a block diagram of a transactional system.

FIG. 5 is a block diagram of a transactional system (500), wherein a first data processing system (505) comprises an owning application (510) and a second data processing system (515) comprising a transaction co-ordinator (520) for executing transactions. There is also shown a third data processing system (530) comprising a first participant for managing a first resource (e.g. a database). There is also shown a fourth data processing system (535) comprising a second participant for managing a second resource (e.g. a database). The system (500) also comprises a plurality of logs (525, 535 and 545) to which the transaction co-ordinator (520), the first participant and the second participant can respectively write one or more log records (i.e. wherein a log record comprises data associated with a transaction). It should be understood that components involved in a transaction (i.e. the owning application (510), the transaction co-ordinator (520), Participant 1 and Participant 2) can reside on any data processing system and that the components can all reside on the same data processing system.

The data can be used to facilitate recovery in the event of failure associated with a system on which the transaction co-ordinator and/or a participant are executing. It will be appreciated that such a failure may relate to a loss of power or the failure of a hardware device such as on board memory or a DASD holding a database.

If the transaction co-ordinator fails, participants must wait until the transaction co-ordinator recovers and analyses its log, in order to progress the transaction. It will be appreciated that the lapsed time taken to effect a restart is important to any business. For example, if the re-start of a transaction co-ordinator takes one hour, then a participant e.g. an insurance database, is not available for that hour and business cannot be conducted.

Figure 6:
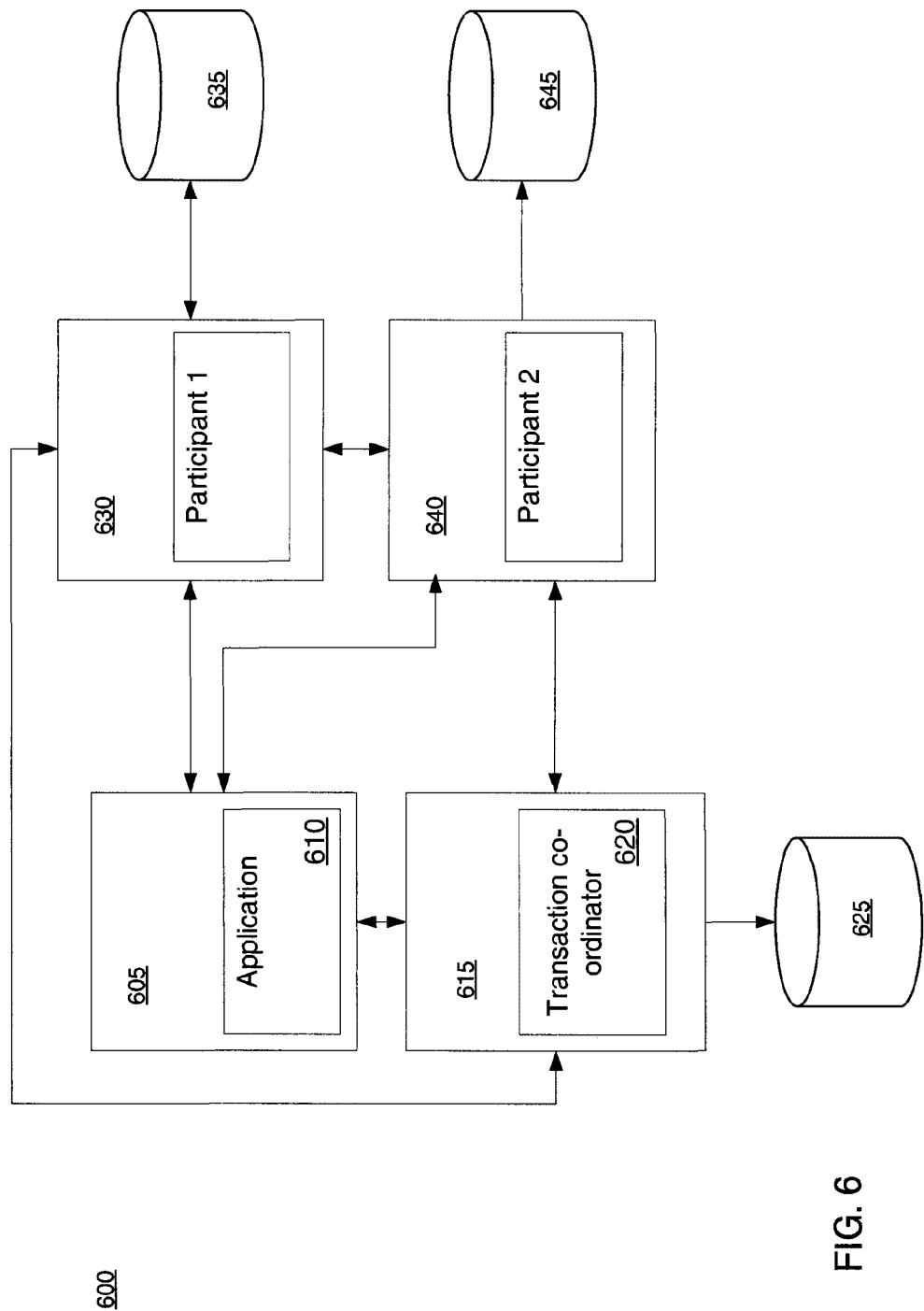
FIG. 6 is a block diagram of a transactional system according to a preferred embodiment.

The preferred embodiment will now be described with reference to FIGS. 6 and 7. FIG. 6 is a block diagram of a transactional system (600), wherein a first data processing system (605) comprises an owning application (610) and a second data processing system (615) comprising a transaction co-ordinator (620) for executing transactions. There is also shown a third data processing system (630) comprising Participant 1 for managing a first resource (e.g. a database). There is also shown a fourth data processing system (640) comprising Participant 2 for managing a second resource (e.g. a database). The system (600) also comprises a plurality of logs (625, 635 and 645) to which the transaction co-ordinator (620), Participant 1 and Participant 2 can respectively write one or more log records (i.e. wherein a log record comprises data associated with a transaction). It should be understood that components involved in a transaction (i.e. the owning application (610), the transaction co-ordinator (620), Participant 1 and Participant 2) can reside on any data processing system and that the components can all reside on the same data processing system.

In the transactional system (600) of the preferred embodiment, Participant 1 and Participant 2 are configurable to communicate.

Figure 7:
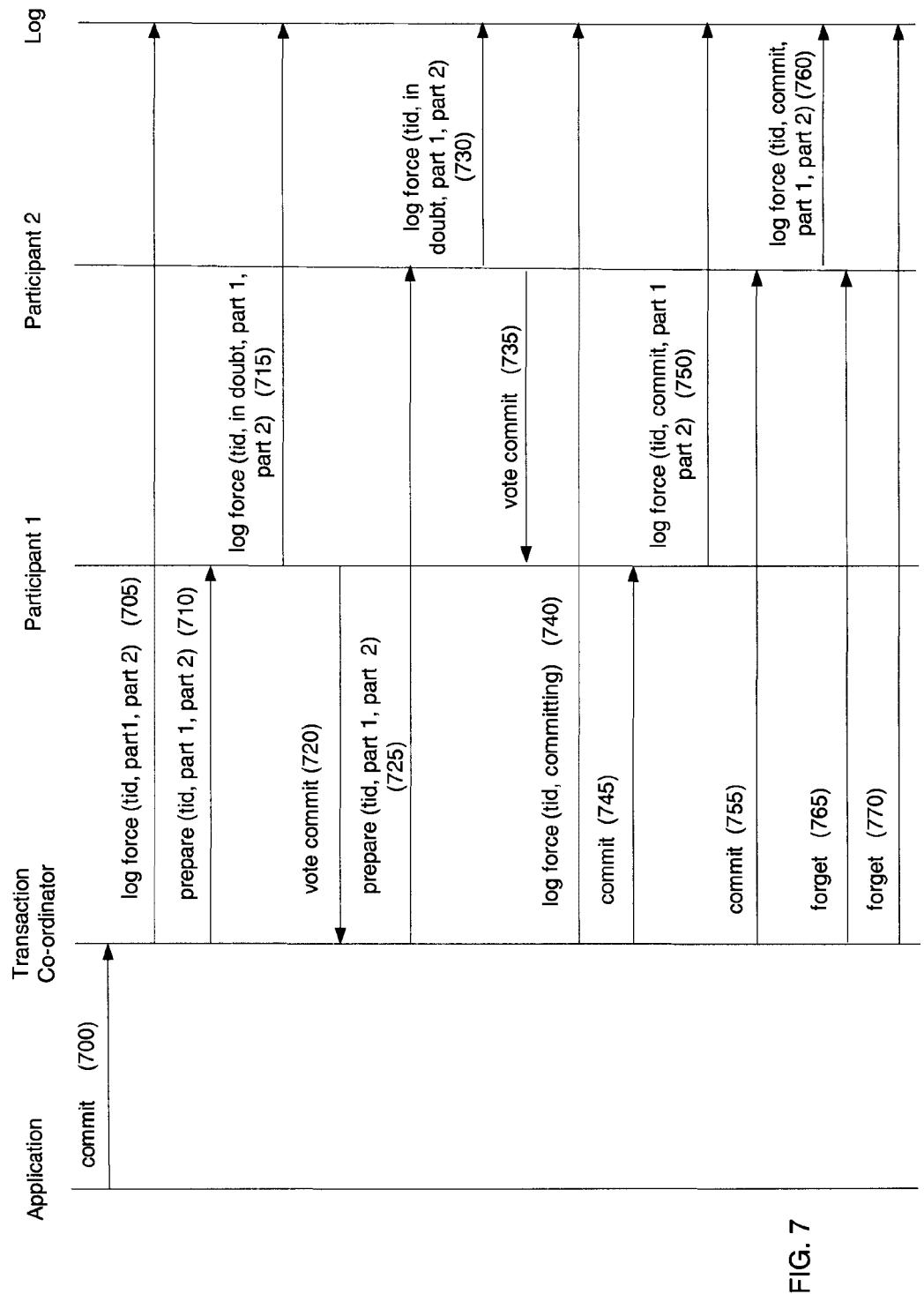
FIG. 7 is a schematic diagram of the components involved in a transaction and the flows between those components according to a preferred embodiment.

FIG. 7 is a schematic diagram of the components involved in the transactional system (600) of FIG. 6 and the flows involved between the components. The application (610) flows a begin request to the transaction co-ordinator (620), which indicates the start of a transaction. Next, the application (610) sends an update request to Participant 1. In response to receiving the update request, Participant 1 registers as a participant in the transaction with the transaction co-ordinator (620). Next, the application sends an update request to Participant 2. In response to receiving the update request, Participant 2 registers as a participant in the transaction with the transaction co-ordinator (620). These flows have not been depicted in FIG. 7 for clarity.

In response to Participant 1 and Participant 2 successfully performing the update requests the application (610) sends a commit request (700) to the transaction co-ordinator (620).

In response to the commit request (700) from the application (610), the transaction co-ordinator (620) force writes (705) a first log record to the log (625), wherein the first log record comprises an identifier associated with the transaction, an identifier associated with Participant 1 and an identifier associated with Participant 2. Note that a forced write does not return until the data written is hardened to non-volatile storage.

Alternatively, the method as disclosed above can be applied such that the transaction co-ordinator need not maintain a log.

Next, once the forced log write completes (guaranteeing the data is stored in non-volatile storage), the transaction co-ordinator (620) flows a prepare request (710) to Participant 1. The prepare request comprises data, namely, an identifier associated with the transaction and a list comprising identifiers associated with all of the participants in the transaction which, in this example, is Participant 1 and Participant 2. Alternatively, the prepare request comprises an identifier associated with each other participant in the transactions i.e. Participant 2.

In response to receiving the prepare request and associated data, Participant 1 writes (715) a second log record to the log (635), wherein the second log record comprises the transaction identifier, a state associated with the transaction, namely, "in doubt", the Participant 1 identifier and the Participant 2 identifier. Next, Participant 1 flows a commit vote (720) (i.e. a response) to the transaction co-ordinator (620), indicating that Participant 1 can successfully participate in the transaction.

Next, the transaction co-ordinator (620) flows a prepare request (725) to Participant 2. The prepare request comprises data, namely, an identifier associated with the transaction and a list comprising identifiers associated with all of the participants in the transaction which, in this example, is Participant 1 and Participant 2.

In response to receiving the prepare request and associated data, Participant 2 writes (730) a third log record to the log (645), wherein the third log record comprises the transaction identifier, a state associated with the transaction, namely, "in doubt", the Participant 1 identifier and the Participant 2 identifier. Next, Participant 2 flows a commit vote (735) (i.e. a response) to the transaction co-ordinator (620), indicating that Participant 2 can successfully participate in the transaction. Alternatively, the prepare request comprises an identifier associated with each other participant in the transactions i.e. Participant 1.

Once the transaction co-ordinator (620) has collected all votes, the transaction co-ordinator (620) can directly flow a request associated with a computed outcome to the participants. That is, the transaction co-ordinator (620) flows a commit request (745) to Participant 1 and a commit request (755) to Participant 2, indicating to the participants that they should commit the transaction.

In response to receiving the commit request, Participant 1 force writes (750) a fourth log record to the log (635), wherein the fourth log record comprises the transaction identifier, a state associated with the transaction, namely, "commit" and the Participant 2 identifier. In response to receiving the commit request, Participant 2 force writes (760) a fifth log record to the log, wherein the fifth log record comprises the transaction identifier, a state associated with the transaction, namely, "commit" and the Participant 1 identifier.

Participants in a transaction cannot forget the transaction until the transaction co-ordinator states that it is acceptable to do so. This is because the transaction co-ordinator must ensure that it can retrieve enough data from the participants in order to re-build the transaction upon failure of the transaction co-ordinator. Thus, after the transaction has been committed, the transaction co-ordinator (620) flows an explicit forget request (780) to Participant 1 and an explicit forget request (785) to Participant 2. Now, the participants' log records comprising participant data can be purged.

A process according to the preferred embodiment will now be described with reference to FIGS. 6, 7 and 8. In the event of failure of the transaction co-ordinator (620), a participant detects (step 800) the failure in any one of a plurality of methods. In one example, a participant is not able to respond to a "prepare" command. In another example, a participant responds to a "prepare" command at regular intervals until a threshold is reached, at which the participant determines that the transaction co-ordinator has failed. In yet another example, a time out value is reached whilst a participant waits for an outcome from the transaction co-ordinator.

Figure 8:
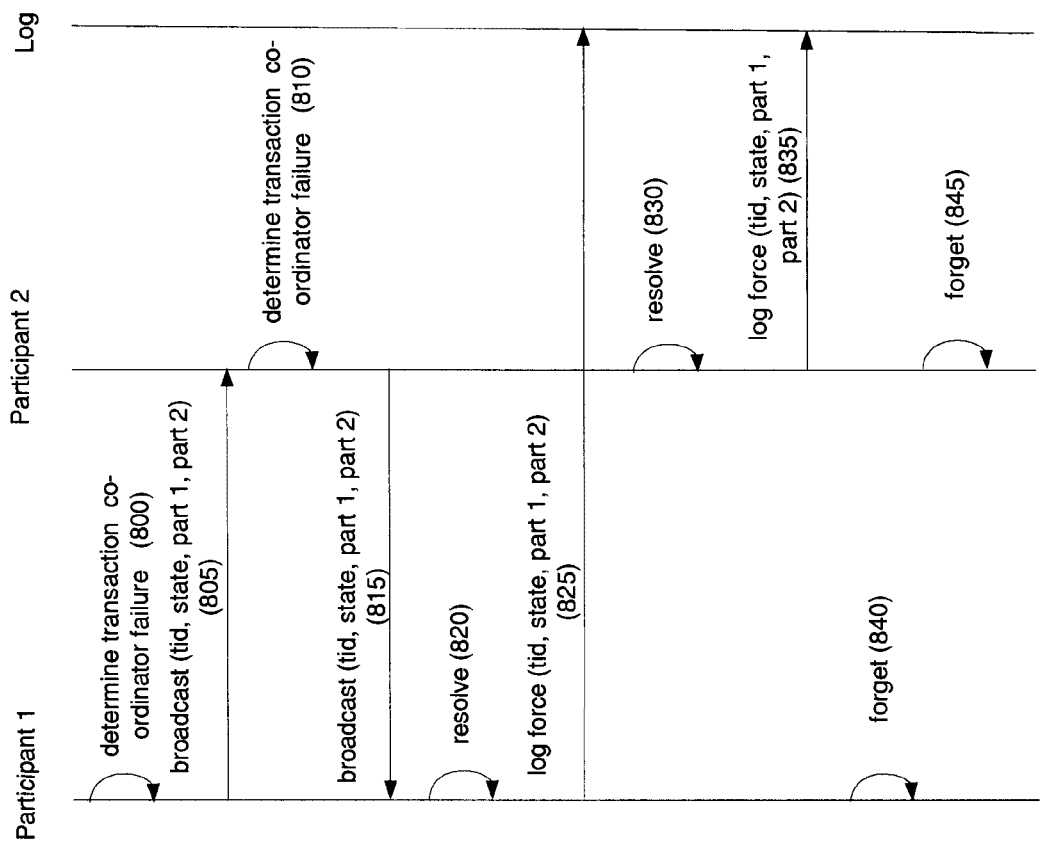
FIG. 8 is a schematic diagram of the components involved in transaction resolution and the flows between those components according to a preferred embodiment.

With reference to FIG. 8, in response to Participant 1 determining (step 800) that the transaction co-ordinator (620) has failed, Participant 1, checks a transaction identifier of the transaction being co-ordinated by the transaction co-ordinator (620). Participant 1 then compares the transaction identifier of the transaction against one or more log records in its log (635). In response to the comparison, Participant 1 determines a state associated with the transaction and an identifier associated with each other participant in the transaction, (i.e. Participant 2).

Participant 1 sends (step 805) a broadcast message to Participant 2. The message comprises a field comprising a transaction identifier and a field comprising a state associated with the transaction. Preferably, the message comprises the list comprising identifiers associated with all of the participants in the transaction which, in this example, is Participant 1 and Participant 2. Thus, advantageously, in the case where the transaction co-ordinator fails before sending a prepare request to Participant 2, Participant 2 will receive Participant 1's identifier from Participant 1 itself. Preferably, Participant 1 waits for a broadcast message from Participant 2 for a pre-determined time threshold.

Likewise, in response to Participant 2 determining (step 810) that the transaction co-ordinator (620) has failed, Participant 2, checks a transaction identifier of the transaction being co-ordinated by the transaction co-ordinator (620). Participant 2 then compares the transaction identifier of the transaction against one or more log records in its log (645). In response to the comparison, Participant 2 determines a state associated with the transaction and an identifier associated with each other participant in the transaction, (i.e. Participant 1).

Participant 2 sends (step 815) a broadcast message to Participant 1. The message comprises a field comprising a transaction identifier and a field comprising a state associated with the transaction. Preferably, the message also comprises the list comprising identifiers associated with all of the participants in the transaction which, in this example, is Participant 1 and Participant 2. Preferably, Participant 2 waits for a broadcast message from Participant 1 for a pre-determined time threshold.

In response to receiving the broadcast message from Participant 2, Participant 1 aggregates a state associated with the transaction from its log records with the received state associated with the transaction from Participant 2 in order to resolve (step 820) the transaction.

In response to resolving the transaction, Participant 1 force writes (step 825) a log record to its log (635), wherein the log record comprises the transaction identifier, a state associated with the transaction, the Participant 1 identifier and the Participant 2 identifier.

In response to receiving the broadcast message from Participant 1, Participant 2 aggregates a state associated with the transaction from its log records with the received state associated with the transaction from Participant 1 in order to resolve (step 830) the transaction.

In response to resolving the transaction, Participant 2 force writes (step 835) a log record to its log (645), wherein the log record comprises the transaction identifier, a state associated with the transaction, the Participant 1 identifier and the Participant 2 identifier.

Preferably, upon restart of the transaction co-ordinator (620), the participants communicate their log records to the transaction co-ordinator (620).

Preferably, participants in a transaction cannot forget (step 840, step 845) the transaction until the transaction co-ordinator (620) restarts and states that it is acceptable to do so. This is because each participant must ensure that it can retrieve enough data from its log and from each other participant in order to re-build the transaction upon failure of the transaction co-ordinator (620). Thus, upon restart the participants communicate their log records to the transaction co-ordinator (620). Upon determining that the transaction has been resolved, transaction co-ordinator (620) flows an explicit forget request to Participant 1 and an explicit forget request to Participant 2. Now, the participants' log records comprising participant data can be purged.

Alternatively, a participant in a transaction cannot forget (step 840, step 845) the transaction until sending a message to each other participant confirming that the transaction has been resolved by the participant and until receiving a message from each other participant confirming that the transaction has been resolved by the each other participant.

Thus, preferably, upon resolving the transaction (step 820), Participant 1 sends a broadcast message to Participant 2. The message comprises a field comprising a transaction identifier and a field comprising the state associated with the resolved transaction. Preferably, receipt of the broadcast message is acknowledged by Participant 2.

Also, preferably, upon resolving the transaction (step 830), Participant 2 sends a broadcast message to Participant 1. The message comprises a field comprising a transaction identifier and a field comprising the state associated with the resolved transaction. Preferably, receipt of the broadcast message is acknowledged by Participant 1.

Once Participant 1 has sent a broadcast message comprising the state associated with the resolved transaction and once Participant 1 has received from Participant 2, a broadcast message comprising the state associated with the resolved transaction, Participant 1 purges its log records. Once Participant 2 has sent a broadcast message comprising the state associated with the resolved transaction and once Participant 2 has received from Participant 1, a broadcast message comprising the state associated with the resolved transaction, Participant 2 purges its log records.

In a tenth example, in the event that the transaction co-ordinator (620) fails before a prepare request is sent to Participant 1, the participants do not contact each other. This is because each of the participants can assume backout.

According to the preferred embodiment, in an eleventh example, in the event that the transaction co-ordinator (620) fails after receiving a commit vote from Participant 1, in response to detecting (step 800) failure of the transaction co-ordinator (620), Participant 1 checks a transaction identifier (e.g. T1) of the transaction being co-ordinated by the transaction co-ordinator (620). Participant 1 then compares the transaction identifier of the transaction against one or more log records in its log (635). In response to the comparison, Participant 1 determines a state associated with the transaction and an identifier associated with each other participant in the transaction, (i.e. Participant 2).

Participant 1 sends (step 805) a broadcast message to Participant 2. The message comprises a field comprising a transaction identifier and a field comprising a state associated with the transaction. Preferably, the message comprises the list comprising identifiers associated with all of the participants in the transaction which, in this example, is Participant 1 and Participant 2. An example of the broadcast message is shown below:

broadcast (T1; in doubt, part 1, part 2)

Likewise, in response to Participant 2 determining (step 810) that the transaction co-ordinator (620) has failed, Participant 2, checks a transaction identifier (i.e. T1) of the transaction being co-ordinated by the transaction co-ordinator (620). Participant 2 then compares the transaction identifier of the transaction against one or more log records in its log (645). In response to the comparison, Participant 2 determines a state associated with the transaction and an identifier associated with each other participant in the transaction, (i.e. Participant 1).

In response to receiving the broadcast message from Participant 1, Participant 2 determines that a prepare message was sent to Participant 1 by the transaction co-ordinator (620).

In the preferred embodiment, in response to determining that a prepare message was sent to Participant 1, Participant 2 prepares and sends (step 815) a broadcast message to Participant 1. The message comprises a field comprising a transaction identifier and a field comprising a state associated with the transaction. Preferably, the message comprises the list comprising identifiers associated with all of the participants in the transaction which, in this example, is Participant 1 and Participant 2. An example of the broadcast message is shown below:

broadcast (T1; in doubt, part 1, part 2)

In response to receiving the broadcast message from Participant 2, Participant 1 aggregates a state (i.e. in doubt) associated with the transaction from its log records with the received state (i.e. in doubt) associated with the transaction from Participant 2 in order to resolve (step 820) the transaction. In the eleventh example, Participant 1 resolves (step 820) the transaction by committing.

In response to resolving the transaction, Participant 1 force writes (step 825) a log record to its log (635), wherein the log record comprises the transaction identifier, a state associated with the transaction, the Participant 1 identifier and the Participant 2 identifier.

Preferably, Participant 1 sends a broadcast message to Participant 2. The message comprises a field comprising a transaction identifier and a field comprising the state associated with the resolved transaction. Preferably, receipt of the broadcast message is acknowledged by Participant 2.

In response to receiving the broadcast message from Participant 1, Participant 2 aggregates a state (i.e. in doubt) associated with the transaction from its log records with the received state (i.e. in doubt) associated with the transaction from Participant 1 in order to resolve (step 830) the transaction. In the eleventh example, Participant 2 resolves (step 830) the transaction by committing.

In response to resolving the transaction, Participant 2 force writes (step 835) a log record to its log (645), wherein the log record comprises the transaction identifier, a state associated with the transaction, the Participant 1 identifier and the Participant 2 identifier.

Preferably, Participant 2 sends a broadcast message to Participant 1. The message comprises a field comprising a transaction identifier and a field comprising the state associated with the resolved transaction. Preferably, receipt of the broadcast message is acknowledged by Participant 1.

The log records of Participant 1 and Participant 2 are now eligible for purging (steps 840 and 845).

Alternatively, in a twelfth example, in the event that the transaction co-ordinator (620) fails after receiving a commit vote from Participant 1, in response to detecting (step 800) failure of the transaction co-ordinator (620), Participant 1 checks a transaction identifier (e.g. T2) of the transaction being co-ordinated by the transaction co-ordinator (620). Participant 1 then compares the transaction identifier of the transaction against one or more log records in its log (635). In response to the comparison, Participant 1 determines a state associated with the transaction and an identifier associated with each other participant in the transaction, (i.e. Participant 2).

Participant 1 sends (step 805) a broadcast message to Participant 2. The message comprises a field comprising a transaction identifier and a field comprising a state associated with the transaction. Preferably, the message comprises the list comprising identifiers associated with all of the participants in the transaction which, in this example, is Participant 1 and Participant 2. An example of the broadcast message is shown below:

broadcast (T2; in doubt, part 1, part 2)

Likewise, in response to Participant 2 determining (step 810) that the transaction co-ordinator (620) has failed, Participant 2, checks a transaction identifier (i.e. T2) of the transaction being co-ordinated by the transaction co-ordinator (620). Participant 2 then compares the transaction identifier of the transaction against one or more log records in its log (645). In response to the comparison, Participant 2 determines a state associated with the transaction and an identifier associated with each other participant in the transaction, (i.e. Participant 1).

It should be understood that because the transaction co-ordinator (620) fails before a prepare request was sent to Participant 2, Participant 2 has no log record and assumes backout.

Participant 2 sends (step 815) a broadcast message to Participant 1. The message comprises a field comprising a transaction identifier and a field comprising a state associated with the transaction. Preferably, the message comprises the list comprising identifiers associated with all of the participants in the transaction which, in this example, is Participant 1 and Participant 2. An example of the broadcast message is shown below:

broadcast (T2; backout, part 1, part 2)

In response to receiving the broadcast message from Participant 2, Participant 1 aggregates a state (i.e. in doubt) associated with the transaction from its log records with the received state (i.e. backout) associated with the transaction from Participant 2 in order to resolve (step 820) the transaction. In the twelfth example, Participant 1 resolves (step 820) the transaction by backing out.

There is no need for Participant 1 to write to its log, because Participant 2 has already resolved the transaction (i.e. Participant 2 assumed backout). Thus, there is also no need for log records associated with Participant 1 and Participant 2 to be purged.

In a thirteenth example, in the event that the transaction co-ordinator (620) fails after a commit request is sent to Participant 1. In response to receiving the commit request Participant 1 commits. In response to committing, Participant 1 force writes a log record to its log (635), wherein the log record comprises the transaction identifier, a state associated with the transaction, the Participant 1 identifier and the Participant 2 identifier. It should be understood that the transaction has not reached the state at which Participant 1 is told to forget the transaction.

In response to detecting (step 800) failure of the transaction co-ordinator (620), Participant 1 checks a transaction identifier (e.g. T3) of the transaction being co-ordinated by the transaction co-ordinator (620). Participant 1 then compares the transaction identifier of the transaction against one or more log records in its log (635). In response to the comparison, Participant 1 determines a state associated with the transaction and an identifier associated with each other participant in the transaction, (i.e. Participant 2).

Participant 1 sends (step 805) a broadcast message to Participant 2. The message comprises a field comprising a transaction identifier and a field comprising a state associated with the transaction. Preferably, the message comprises the list comprising identifiers associated with all of the participants in the transaction which, in this example, is Participant 1 and Participant 2. An example of the broadcast message is shown below:

broadcast (T3; commit, part 1, part 2)

Likewise, in response to Participant 2 determining (step 810) that the transaction co-ordinator (620) has failed, Participant 2, checks a transaction identifier (i.e. T3) of the transaction being co-ordinated by the transaction co-ordinator (620). Participant 2 then compares the transaction identifier of the transaction against one or more log records in its log (645). In response to the comparison, Participant 2 determines a state associated with the transaction and an identifier associated with each other participant in the transaction, (i.e. Participant 1).

Participant 2 sends (step 815) a broadcast message to Participant 1. The message comprises a field comprising a transaction identifier and a field comprising a state associated with the transaction. Preferably, the message comprises the list comprising identifiers associated with all of the participants in the transaction which, in this example, is Participant 1 and Participant 2. An example of the broadcast message is shown below:

broadcast (T3; in doubt, part 1, part 2)

In response to receiving the broadcast message from Participant 1, Participant 2 aggregates a state (i.e. in doubt) associated with the transaction from its log records with the received state (i.e. commit) associated with the transaction from Participant 1 in order to resolve (step 830) the transaction. In the thirteenth example, Participant 2 resolves (step 830) the transaction by committing.

In response to resolving the transaction, Participant 2 force writes (step 835) a log record to its log (645), wherein the log record comprises the transaction identifier, a state associated with the transaction, the Participant 1 identifier and the Participant 2 identifier.

It should be understood that Participant 2 has already received from Participant 1, a broadcast message comprising a field comprising a transaction identifier and a field comprising the state associated with the resolved transaction. This is because Participant 1 committed the transaction. Preferably, receipt of the broadcast message is acknowledged by Participant 2.

Preferably, Participant 2 sends a broadcast message to Participant 1. The message comprises a field comprising a transaction identifier and a field comprising the state associated with the resolved transaction. Preferably, receipt of the broadcast message is acknowledged by Participant 1.

The log records of Participant 1 and Participant 2 are now eligible for purging (steps 840 and 845).

Advantageously, a transaction can be resolved by a participant without the participant having to wait until the transaction co-ordinator is restarted. Thus, resources do not have to remain locked and delays are alleviated.

The invention claimed is:

1. A method for providing atomicity for a unit of work involving a plurality of participants, the method comprising the steps of:
   sending a prepare request to at least two participants involved in a transaction, wherein the prepare request prevents a participant receiving the prepare request from assuming a rollback of updates associated with the transaction, and wherein the prepare request comprises data including an indicated outcome of the unit of work, the indicated outcome being either rollback or commit; and
   in response to occurrence of a need to recover the unit of work, recovering the unit of work comprising:
   obtaining the data from the at least one participant; and
   using the obtained data to recover and preserve the atomicity of the unit of work.

2. The method as claimed in claim 1 wherein a different indicated outcome of the unit of work is sent to different said participants.

3. The method as claimed in claim 1 wherein the data further comprises a list of other participants in the unit of work also receiving said prepare request.

4. The method as claimed in claim 2 wherein the data sent to a last participant to which said prepare request is sent comprises an indication that the outcome of the unit of work is commit, while data sent to all other participants to which said prepare request is sent comprises an indication that the outcome of the unit of work is rollback.

5. The method as claimed in claim 4 wherein the step of recovering the unit of work further comprises:
   in response to the obtained data comprising an indication that the outcome of the unit of work is commit, sending a commit request to at least one said participant.

6. The method as claimed in claim 1, further comprising the step of:
   sending a forget request to at least one said participant.

7. The method of claim 1 in which a transaction coordinator does not write data associated with an outcome of said unit of work to a log.

8. A system for providing atomicity for a unit of work involving a plurality of participants, the system comprising:
   a transaction coordinator that communicates electronically with the plurality of participants, the transaction coordinator comprising a data processing system programmed for sending a prepare request to at least two participants involved in said unit of work, wherein the prepare request to each said participant prevents that participant from assuming a rollback of updates associated with the transaction, and wherein the prepare request comprises data including an indicated outcome of the unit of work, the indicated outcome being either rollback or commit, wherein a different indicated outcome of the unit of work is sent to different participants; and
   the transaction coordinator, responsive to occurrence of a need to recover the unit of work, being programmed to retrieve information from said participants regarding said unit of work.

9. The system according to claim 8 wherein the data of each prepare request further comprises an identification of all other said participants receiving said prepare request.

10. The system according to claim 8 wherein an outcome of the unit of work sent to a first of the at least two participants is rollback.

11. The system according to claim 10 wherein an outcome of the unit of work sent to a last participant is commit.

12. A computer program product for providing atomicity for a unit of work involving a plurality of participants, the computer program product comprising a non-transitory computer usable storage medium having computer usable program code embodied therewith, the computer usable program code comprising:

computer usable program code configured to send a prepare request to at least two participants involved in a transaction, wherein the prepare request prevents a participant receiving the prepare request from assuming a rollback of updates associated with the transaction, and wherein the prepare request comprises data including an indicated outcome of the unit of work, the indicated outcome being either rollback or commit, and an identification of all other participants receiving said prepare request; and computer usable program code responsive to occurrence of a need to the unit of work, to recover the unit of work by obtaining the data from the at least one participant; and using the obtained data to recover and preserve the atomicity of the unit of work.

13. The computer program product according to claim 12 wherein no data associated with the outcome of the unit of work is written to a log by a transaction coordinator system.

14. The computer program product according to claim 12 wherein two different participants in the unit of work receive different indicated outcomes in respective said prepare requests.

15. The computer program product according to claim 14 wherein said computer usable program code configured to send a prepare request to at least one participant further comprises computer usable program code configured to send an indicated outcome of commit in a prepare request to a first said participant and an indicated outcome of rollback in a prepare request to a second said participant.

16. The computer program product according to claim 12 further comprising computer usable program code configured to send a forget request to the at least one participant.

17. The method of claim 7 in which, upon failure and restart of said transaction coordinator, said participants transmit their log records to said transaction coordinator.

\* \* \* \* \*